(12) United States Patent
Wilkens et al.

(10) Patent No.: US 6,257,131 B1
(45) Date of Patent: Jul. 10, 2001

(54) CHANNEL BALER

(75) Inventors: Dieter Wilkens, Wolfenbüttel-Ahlum; Jürgen Röhrbein, Wahle, both of (DE)

(73) Assignee: Welger GmbH, Wolfenbüttel (DE)

( * ) Notice: Subject to any disclaimer, the term of this patent is extended or adjusted under 35 U.S.C. 154(b) by 0 days.

(21) Appl. No.: 09/299,239

(22) Filed: Apr. 23, 1999

(30) Foreign Application Priority Data

Apr. 23, 1998 (DE) .............................. 198 18 127

(51) Int. Cl.⁷ .................................................. B30B 15/26
(52) U.S. Cl. .............................. 100/43; 100/50; 100/192; 100/53
(58) Field of Search ............................ 100/43, 50, 52, 100/53, 192, 282, 283

(56) References Cited

U.S. PATENT DOCUMENTS

| | | |
|---|---|---|
| 3,350,999 | 11/1967 | Morse . |
| 3,487,772 * | 1/1970 | Kraft ........................ 100/53 |
| 3,908,436 | 9/1975 | Bothe . |
| 4,026,207 | 5/1977 | Gailus et al. . |
| 4,085,669 * | 4/1978 | Yonezama ................. 100/53 |
| 4,148,254 * | 4/1979 | Graber et al. ............. 100/192 |
| 4,168,659 * | 9/1979 | Yatcilla et al. ............ 100/43 |
| 4,280,403 * | 7/1981 | Alderson ................... 100/192 |
| 4,565,123 * | 1/1986 | Sanders .................... 100/43 |
| 5,123,338 * | 6/1992 | Mathis ...................... 100/192 |
| 5,735,197 | 4/1998 | Kleine . |

FOREIGN PATENT DOCUMENTS

| | | |
|---|---|---|
| 1627940 | 7/1971 | (DE) . |
| 9206232 | 8/1992 | (DE) . |
| 9421133 | 8/1995 | (DE) . |
| 9644574 | 4/1998 | (DE) . |
| 0346586 | 12/1989 | (EP) . |
| 0235397 | 2/1990 | (EP) . |
| 2139955 | 1/1973 | (FR) . |

* cited by examiner

Primary Examiner—Peter Vo
Assistant Examiner—Louis K. Huynh
(74) Attorney, Agent, or Firm—Brown & Wood, LLP

(57) ABSTRACT

A channel baler including a pressure channel, a plunger located in the pressure channel, a thrust crank drive for reciprocating the plunger in the pressure channel, and an element which provides for elastic yielding of at least one element of a pressure system including the pressure channel, the plunger and the thrust crank drive, in an axial direction by a path corresponding approximately to a thickness of a compressed bale upon a plunger power exceeding a predetermined value.

2 Claims, 5 Drawing Sheets

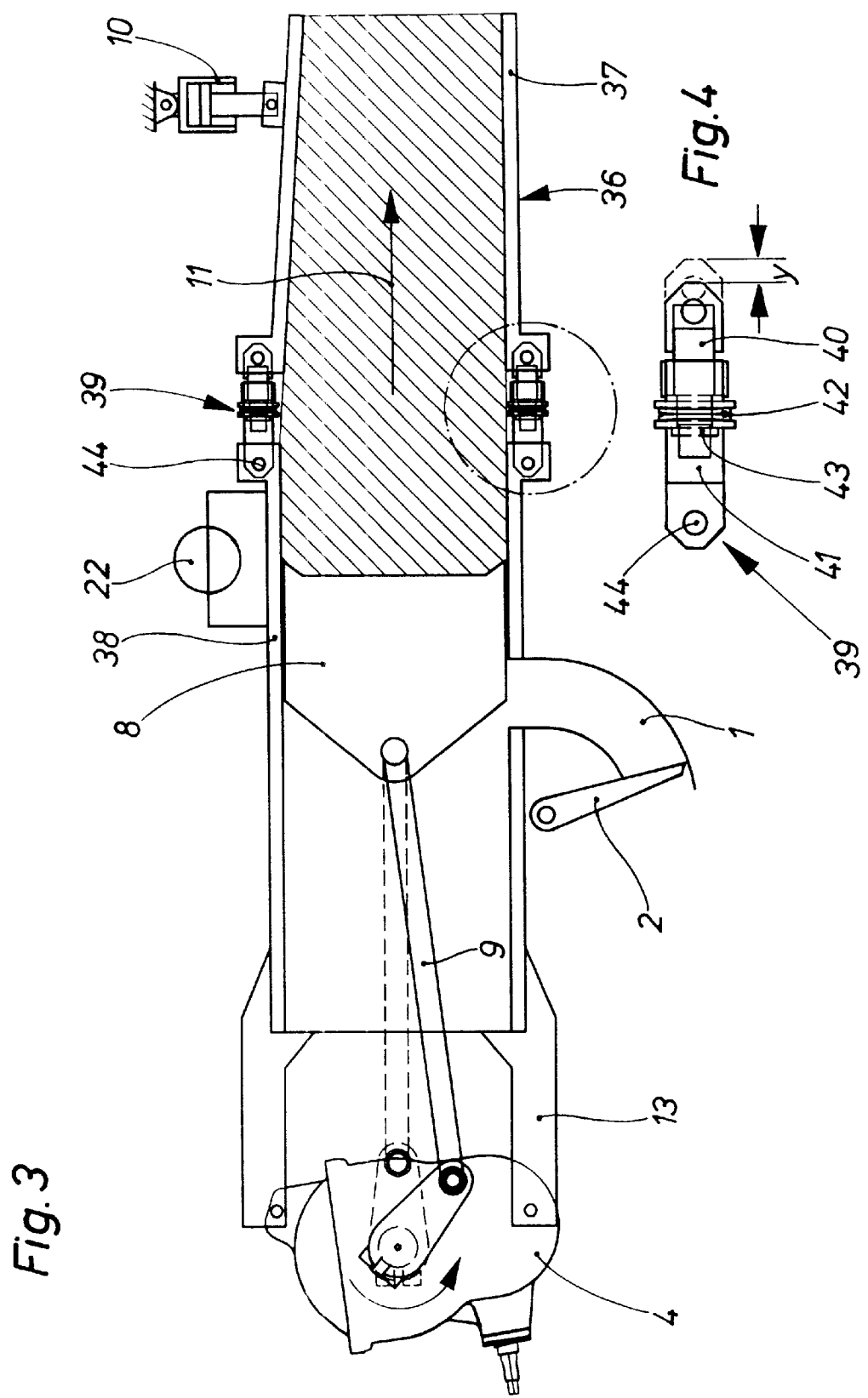

CHANNEL BALER

BACKGROUND OF THE INVENTION

1. Field of the Invention

The present invention relates to a channel baler including a pressure channel, a plunger located in the pressure channel, and a thrust crank drive for displacing the plunger in the pressure channel.

2. Description of the Prior Art

It is generally known to provide means for protecting a baler drive from an overload. Such means, for example, as used in a big baler "Quadrant 1200" of the "Claas" type. When the pressure plunger applies too large a force, bending of a crossbar of the drive suspension by several mm results in the opening of a four-way directional control valve which leads to a reduction of hydraulic pressure in the hydraulic cylinders responsible for tensioning the pressure channel. Upon release of the baler, the predetermined pressure is restored.

In addition, between the main drive and the drive gear, shearing protection means is provided. The drawback of this arrangement consists in that the reduction in the resistance of the compressed mass, as a result of movement of the side wall of the pressure channel, takes place rather slowly for the required reduction of the density. A further drawback consists in that, e.g., the formation of large compressed packages or bales from moist products results in actuation of the shearing protection means at the last strokes. This leads to stoppage of the baler.

German Publication DE 92 06 232 discloses a large baler in which between the drive gear and the main drive, there is provided means for an automatic breaking and restoration of the drive chain. The response torque of the coupling should be adjusted very precisely, otherwise the coupling would respond too quickly at a low overload or too slowly at a large overload.

U.S. Pat. No. 4,565,123 discloses a channel baler with a hydraulic drive for the plunger. In addition, the channel baler of U.S. Pat. No. 4,565,123 includes a tension mechanism associated with the pressure channel. When a predetermined pressure in the pressure channel is exceeded, a pressure switch in the hydraulic circuit of the plunger is actuated and causes movement of a valve in the hydraulic circuit of the tension device into the open position of the valve. Thereby, the cross-section of the pressure channel is increased, and blocking of the plunger is prevented. With a free displacement of the plunger, the pressure in the hydraulic circuit of the tension device is automatically restored. There is also provided a pressure-limiting valve for protection from overload and which interrupts the drive upon an occurrence of an overload.

U.S. Pat. No. 3,350,999 discloses a baler including a device which at an end of each bale-forming stroke, releases the baler outlet by releasing, for a short time, the tension mechanism provided at the outlet of the pressure channel. Thereby, blocking of a bale, which is displaced by a newly-formed bale, is prevented. When the hydraulic pressure in the hydraulic circuit of the plunger exceeds a pre-determined value, the pressure in the hydraulic cylinder of the tension device is reduced automatically, and a compressed coil spring, which forms part of the tension device, releases the pressure channel outlet. The device disclosed in U.S. Pat. No. 3,350,999 permits to reduce power consumption which is required for releasing the tension device, and which depends on the pressure forces acting in the pressure channel. A drawback of the device consists in a relatively slow response of the device to increase and decrease of the pressure in the pressure channel.

Further, this arrangement is not suitable for balers with a mechanical thrust crank drive. A further drawback consists in that the bale density is diminished because of a relatively long time during which the pressure channel remains open. The relatively long time, during which the pressure channel remains open, results from a need to release all of the walls of the channel to achieve a desired effect.

European Patent Publication EP 0 235 397 B1 discloses a device for controlling the width of the pressure channel dependent on resistance to the displacement of bales which is caused by friction between the bales and channel walls, resulting from the movement of the bales through the channel. The retaining force of a sliding rail of the pressure channel is determined by a hydraulic cylinder which is provided between the frame of the baler and the sliding rail, and which is used for controlling the position of the slide rail.

Controlling the position of the slide rail permits to achieve a most possible constant compressed density of the rails. Here, likewise, additional overload protection means is provided between the drive gear and the main drive for interrupting force transmission in case of an overload.

Accordingly, an object of the present invention is a channel baler of the above-described type in which the loading peaks of the baler during the bale-forming step are rapidly eliminated without the interruption of force transmission.

Another object of the present invention is achieving high compressed densities without blocking of bale-forming and delivery elements.

SUMMARY OF THE INVENTION

This and other objects of the present invention, which will become apparent hereinafter, are achieved by providing means which insure an elastic yielding of at least one element of a pressure system including the pressure channel, the plunger and the thrust crank drive, in an axial direction by a path corresponding approximately to a thickness of a compressed bale upon plunger power exceeding a predetermined value.

According to the present invention, the plunger, which is driven by a thrust crank drive, is forcefully provided with an additional degree of freedom in a predetermined force or displacement region.

The present invention permits to achieve the following advantages:

During the overload, the force transmission to the drive is not interrupted, and the drive can operate in a certain overload region without affecting the bale density;

the "displacement buffer" provides, at repeated overloads, sufficient time for timely opening of the pressure channel by the next pressure stroke;

an overload protection between the drive gear and the main drive, in particular shearing protection means, can be eliminated because the arrangement according to the present invention, responds very rapidly to any disturbance and reliably prevents large overloads.

The release displacement or the release force can be used for displaying an overload and, if necessary, for controlling other functions with suitable sensors. This permits to eliminate expensive torque-sensing means.

Further, a characteristic curve of the elastic element can be linear in a predetermined load region, with the final value of a predetermined overload range exceeding the initial value, e.g., by 10%, at which final value the yielding of the elastic element begins. As a result, in comparison with conventional overload protection means, the arrangement according to the present invention, permits to increase the density of the bales because the drive force transmission is not interrupted during the time of an overload peak during which the bale, which is held immobilized by active friction force, begins to move as a result of a relatively small sliding friction.

BRIEF DESCRIPTION OF THE DRAWINGS

The features and objects of the present invention will become more apparent, and the invention itself will be best understood from the following detailed description of the preferred embodiments when read with reference to the accompanying drawings, wherein:

FIG. 3 shows a view similar to that of FIG. 1 of a third embodiment of a channel baler according to the present invention;

FIG. 4 shows a detail of FIG. 3 at an increased scale;

DETAILED DESCRIPTION OF THE PREFERRED EMBODIMENTS

Figure 1:
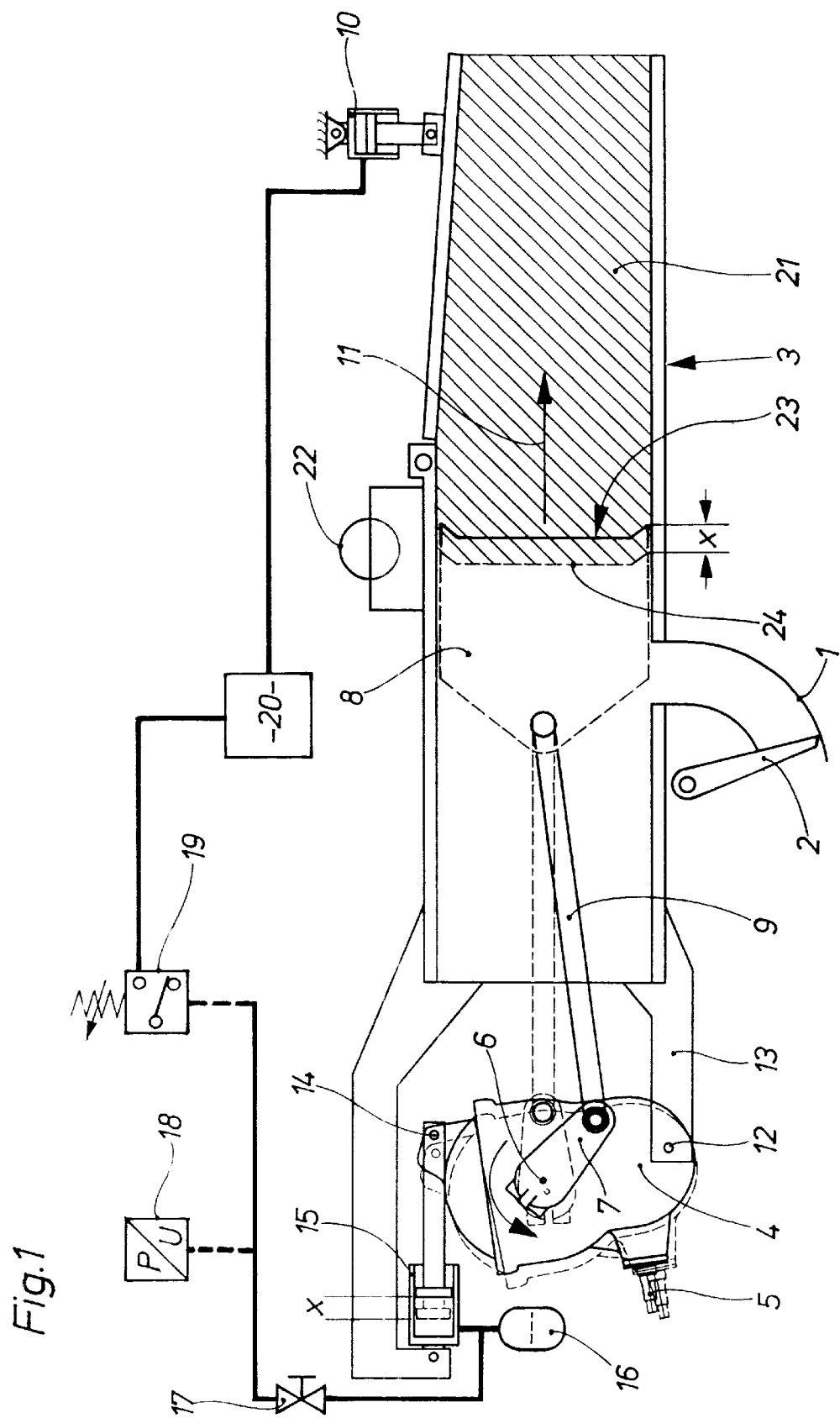
FIG. 1 shows a schematic longitudinal, partially cross-sectional view of a first embodiment of a channel baler according to the present invention.

A channel baler according to the present invention, which is shown in FIG. 1, includes a feeding channel 1 with a delivery element 2 which feeds stalk material from beneath into a pressure channel 3 having a rectangular cross-section.

A main drive 4 is provided in the front section of the pressure channel 3. The drive 4 includes a forward projecting shaft 5 for connection with a power take-off shaft of a tractor, a flywheel (not shown), and a cross-shaft 6, both ends of which project from the drive housing carrying each of a crank arm 7.

A plunger 8 is arranged in the middle section of the pressure channel 3. Two parallel connecting rods 9 are connected with the plunger 8 and have their opposite ends connected with respective crank arms 7.

In the rear section of the pressure channel 3, there is provided a, per se known, tension mechanism 10. The tension mechanism 10 controls compressed density of to-be-formed bales by narrowing the pressure channel 3.

An axle 12, which is located in the bottom area of the drive housing, pivotally connects the main drive 4 with the frame 13 of the baler. A single-acting hydraulic cylinder 15 is arranged between the upper support 14 of the drive 4 and the frame 13. The cylinder side of the cylinder 15 is connected with a hydraulic accumulator 16. The accumulator 16 is connected via a gate valve 17 and a pressure sensor 18 or a pressure switch 19 with a control unit 20 for controlling pressure in the tension mechanism 10.

The initial pressure in the accumulator 16 is so adjusted or selected that with a pressure below the initial pressure, the plunger reciprocates between its front and rear positions and compresses the stalk material into a compressed mass 21. A binding mechanism 22 binds the compressed mass 21, forming bales in, a per se known, manner.

When the pressure applied by the plunger 8 exceeds the initial pressure, the drive 4 pivots about an axle 12 counterclockwise until the pressure in the accumulator 16 again reaches a predetermined end pressure, e.g., 10–20% above the initial pressure, or until the plunger 8 reaches its end position. The pivotal movement of the drive 4 provides the plunger 8 with a variable dead center as a result of imparting to the plunger 8 of a maximum release force or causing its release displacement in the region X, which corresponds somewhat to the thickness of the compressed packing, and which, dependent on the material and the packing density, amounts to a path from about 3 cm to 8 cm.

In FIG. 1, the pressure end position 23 of the end side of the plunger 8 is illustrated with the connecting rod 9 and the crank arm 7 being shown with solid lines and with the release position 24 being illustrated by related elements being shown with dash lines. When the overload is eliminated, the drive 4 automatically pivots into its pressure position.

An overload protection means between the drive plate and the main drive for interrupting force transmission, which was conventionally used in prior art balers, becomes unnecessary and can be eliminated. Furthermore, the arrangement according to the present invention, provides sufficient time for releasing the tension mechanism 10, upon occurence of a large overload. Upon pivoting of the drive 4 into its release position, the pressure in the accumulator 16 increases. This pressure increase is communicated via the pressure sensor 18, the pressure switch 19, or an end switch (not shown) of the accumulator 15 to the control unit 20 which controls pressure in the hydraulic cylinder of the tension mechanism 10.

Further, the use, according to the present invention, of plunger displacement sensors or pressure sensors, permits the operator of the baler to easily determine the actual pressure load which, in turn, permits the operator to operate the baler in the optimal load range, without causing any disturbances.

Figure 2:
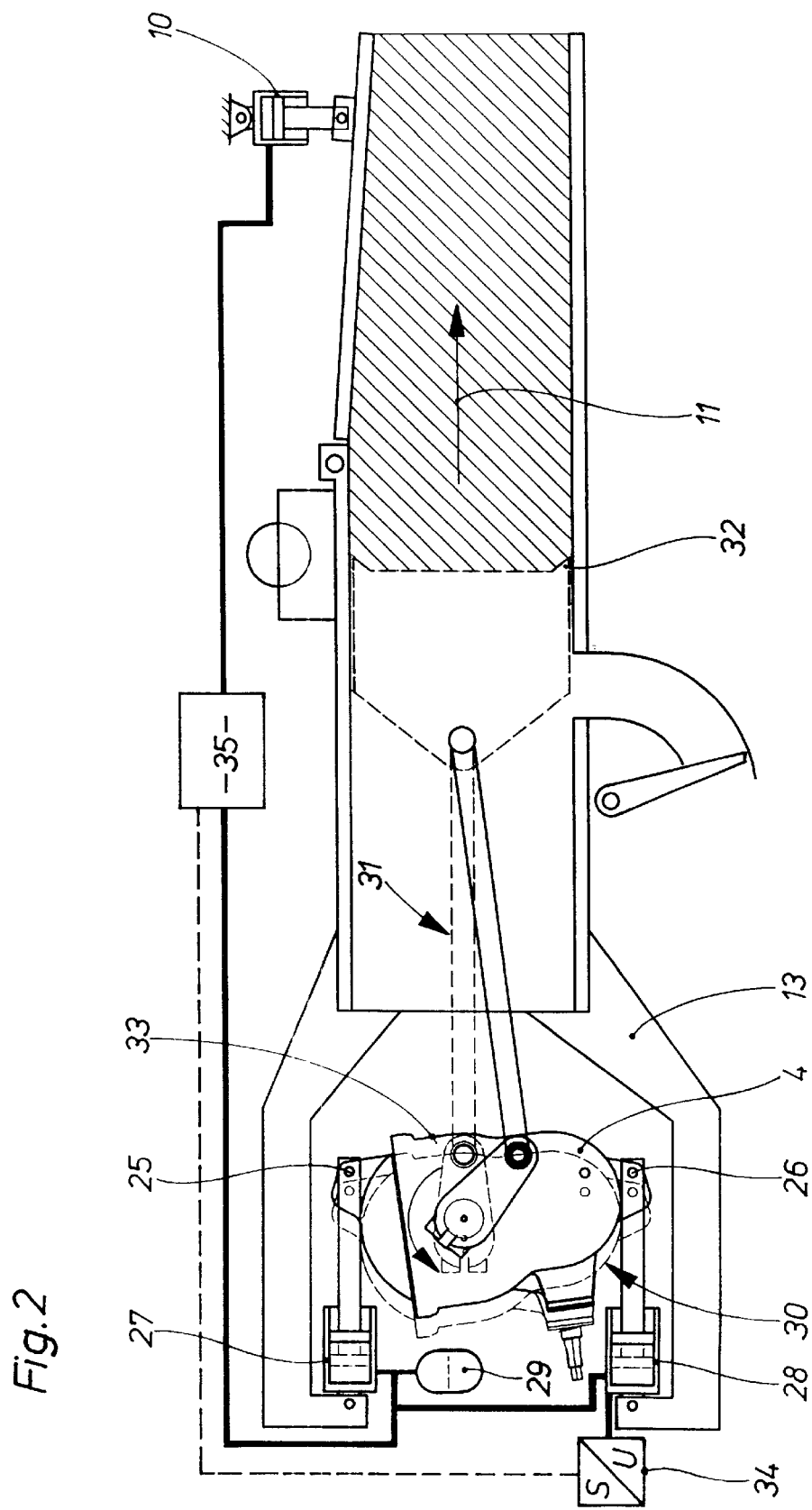
FIG. 2 shows a view similar to that of FIG. 1 of a second embodiment of a channel baler according to the present invention.

In the embodiment of a channel baler shown in FIG. 2, both the upper support 25 of the suspension of the main drive 4 and the lower support 26 are connected to the frame 13 of the baler by respective hydraulic cylinders 27,28. Both hydraulic cylinders 27,28 are connected with a common accumulator 29. They can be connected to the accumulator 29 by a common conduit or separately.

Upon draining of the hydraulic cylinders 27, 28, the main drive moves translationally in a direction opposite to the pressing direction 11 to a release position. The position of the drive 30, the connecting rod 31, and the plunger 8 in the release position of the drive 4 is shown with dash lines. The reference numeral 32 shows the end position of the plunger 8 in the release position. At the return stroke of the plunger 8, the drive 4 automatically returns to its initial position 33. For large overloads, a displacement sensor 34 is associated with the hydraulic cylinder 28.

Upon occurrence of a large overload, the displacement sensor 34 generates a signal which is transmitted to the control unit 35 that controls the operation of the tension mechanism 10. The positions of the plunger 8 and of the tension mechanism 10 need be so coordinated that for the protection of the plunger 8, the tension mechanism always rises despite the variable dead center of the plunger 8.

In the embodiment of the baler according to the present invention, which is shown in FIG. 3, the rear section 36 in which the formation of bales takes place, is made flexible in the pressing direction 11. Generally, all four side walls 37 of the rear section 36 are pivotally connected with the intermediate section 38 of the pressure channel for adjusting the density of the bales.

Each side wall 37 is connected to the intermediate section 38 with a resilient element 39. As it is more clearly shown in FIG. 4, the resilient element 39 is formed as a piston/cylinder unit 40/41 which is preloaded by an intermediate element, e.g., plate springs 42. There are provided two abutments, which are formed as counternuts 43, for the plate springs 42. One abutment is provided on the piston 40, the other abutment is provided on the cylinder 41. The cylinder 41 is connected with the intermediate section 38 of the pressure channel by a twin-axle/bolt connection 44, while the piston 40 is connected with a respective side wall 37 in a similar manner.

Upon occurrence of an overload, the plate springs 42 are compressed by an amount Y, with the piston 40 and the cylinder 41 moving away from each other so that, despite the forced drive of the plunger 8, a telescopic release of the rear section 36 in the pressing direction 11 takes place. In this way the inventive effect is achieved constructively with particularly simple means and in a simple way. As a final size of the release region, such size, for example, can be selected at which the plate springs form a block. Further, the release displacement can be shown with appropriate display means or can be used for different control purposes.

Figure 5:
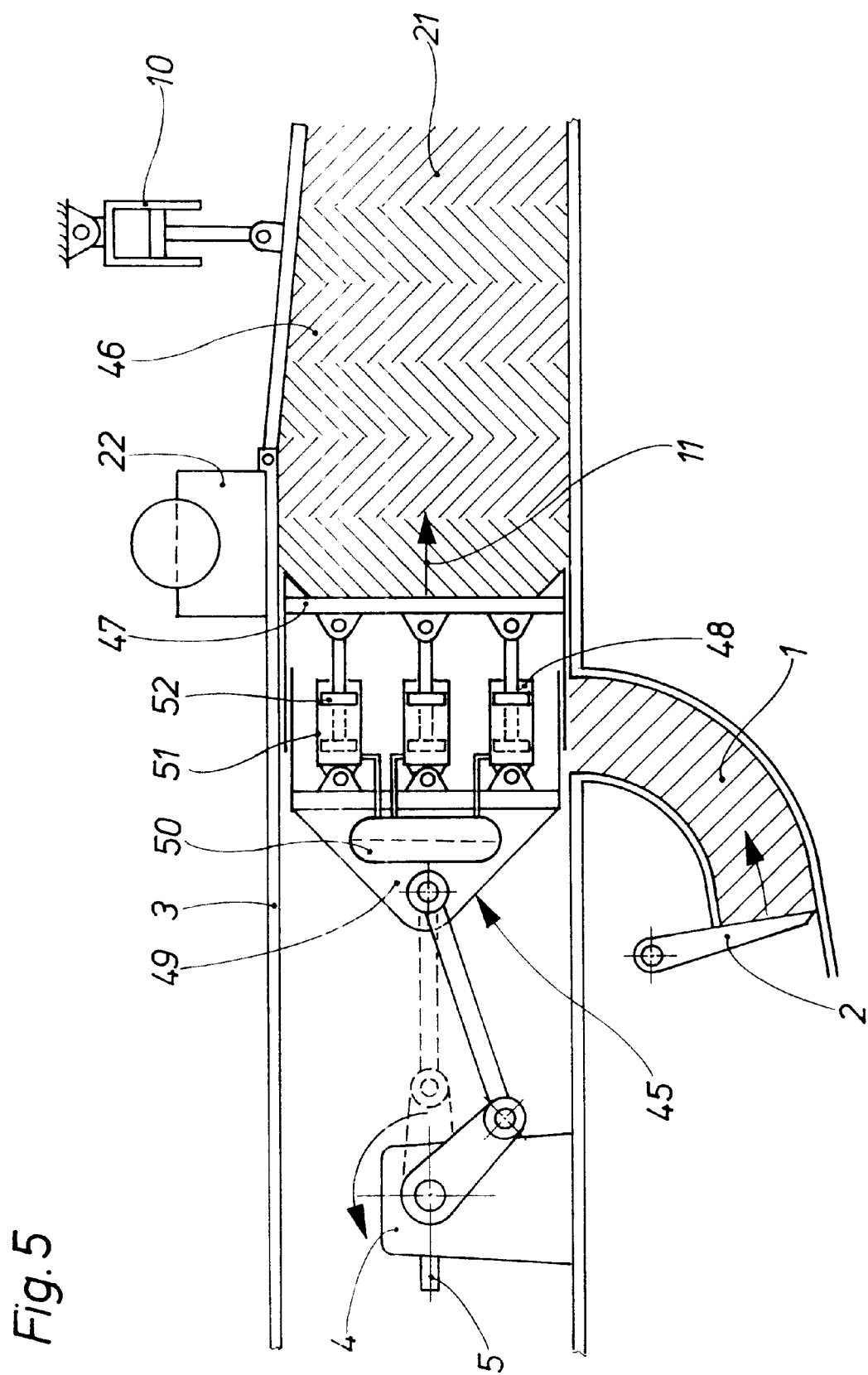
FIG. 5 shows a schematic view of a fourth embodiment of a channel baler according to the present invention.

In the embodiment of a baler according to the present invention which is shown in FIG. 5, the means for imparting the flexibility to the pressure system is associated with the plunger 45. The end wall of the plunger 45 which is adjacent to the compressed mass 46, is formed as a pressure plate 47 displaceably connected with a front or hopper side wall 49 of the plunger 45 by, for example, three single-acting cylinders 48. The cylinder sides of all of the three cylinders 48 are connected with a common accumulator 50 in such a way that the end wall 47 moves in the direction opposite to the pressing upon draining of the cylinders 48. The release position 51 of the piston of the cylinder 48 is shown with dash lines. After the overload is eliminated, the piston returns to its pressure position 52 which is shown with solid lines.

Figure 6:
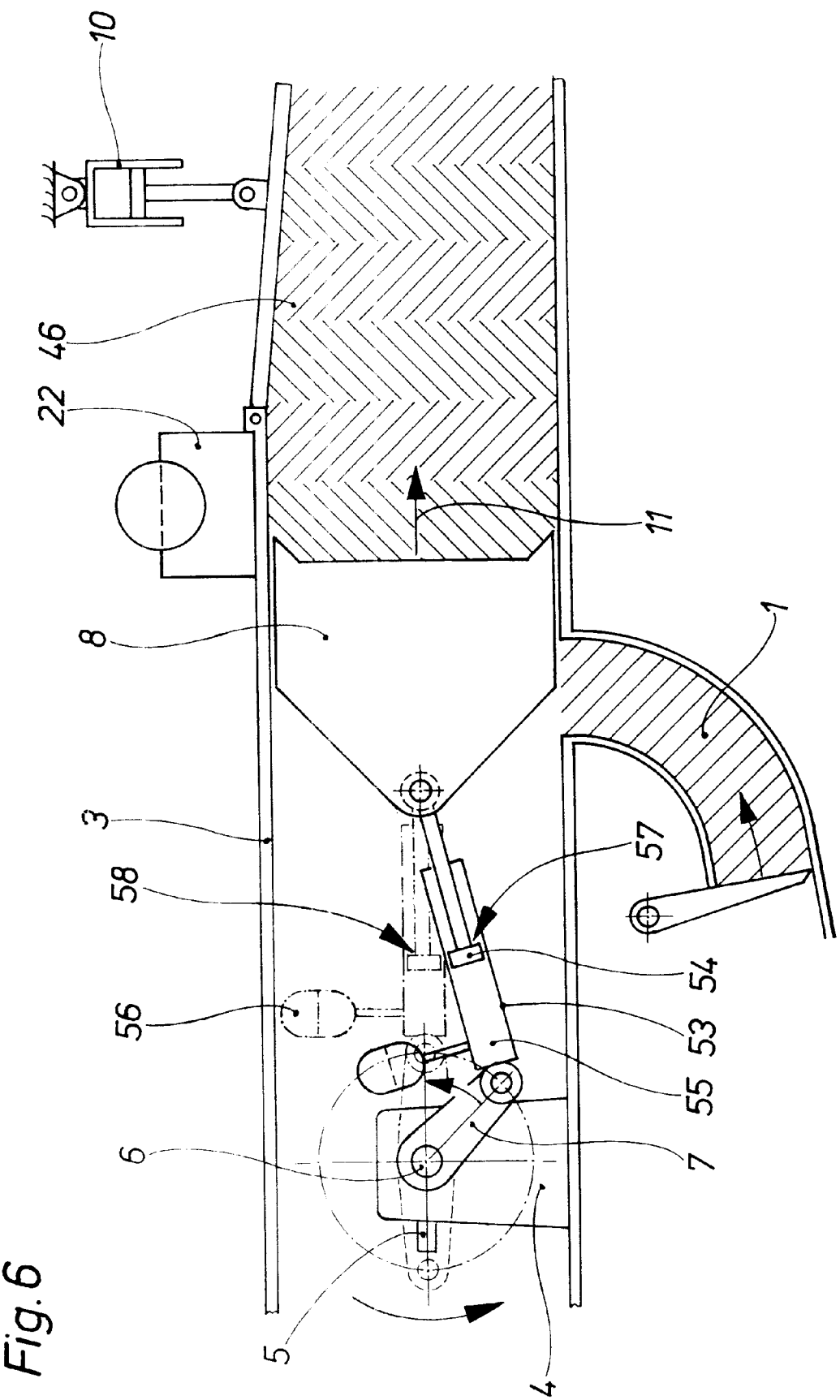
FIG. 6 shows a schematic view of a fifth embodiment of a channel baler according to the present invention.

In the embodiment of a baler according to the present invention which is shown in FIG. 6, only the length of the connecting rod 53 changes. Each connecting rod 53 is formed as a single acting piston-cylinder unit 54/55, with a preloaded piston 54. The preloading of the piston 54 is effected with an accumulator 56. Upon occurrence of an overload, the piston 54 is displaced from its normal position 57 shown with solid lines, into its release position 58, shown with dash-dot lines. The piston 54, thus, has a variable dead center.

It should be noted, that although the present invention is particularly applicable to big balers for agricultural crops with a high thruput, the present invention with all its advantages, is also applicable to stationary balers for paper, cardboard or foil.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed:

1. A channel baler for forming bales of a compressible material, comprising a pressure channel; a plunger located in the pressure channel and displaceable therein in a pressing direction for compressing the material delivered into the pressure channel and in a direction opposite to the pressing direction; a thrust crank drive for reciprocating the plunger between the pressing direction and the direction opposite to the pressing direction; and means for providing elastic yielding of at least one of the pressure channel, the plunger, and the thrust crank drive in the direction opposite to the pressing direction by a path sufficient for releasing a force applied to the plunger upon a plunger power exceeding a predetermined value, wherein the elastic yielding providing means comprises an elastic intermediate member which connects the thrust rank drive with a baler frame and provides for a pivotal movement of the thrust crank drive in the direction opposite to the pressing direction upon the plunger force exceeding the predetermined value.

2. A channel baler for forming bales of a compressible material, comprising a pressure channel; a plunger located in the pressure channel and displaceable therein in a pressing direction for compressing the material delivered into the pressure channel and in a direction opposite to the pressing direction; a thrust crank drive for reciprocating the plunger between the pressing direction and the direction opposite to the pressing direction; and means for providing elastic yielding of at least one of the pressure channel, the plunger, and the thrust crank drive in the direction opposite to the pressing direction by a path sufficient for releasing a force applied to the plunger upon a plunger power exceeding a predetermined value, wherein the elastic yield providing means comprises two elastic intermediate elements which connect the thrust crank drive with a baler frame and provide for a translational movement of the thrust crank drive in the direction opposite to the pressing direction upon the plunger force exceeding the predetermined value.

* * * * *